United States Patent Office 2,904,392
Patented Sept. 15, 1959

2,904,392

METHOD OF PACKAGING AND TREATING ARTICLES

Reuben Pomerantz, Chicago, Ill., and Edward F. Degering, Natick, and Torsten Hasselstrom, Framingham, Mass.

No Drawing. Application April 19, 1956
Serial No. 579,411

3 Claims. (Cl. 21—54)

(Granted under Title 35, U.S. Code (1952), sec. 266)

The invention described herein, if patented, may be manufactured and used by or for the Government for governmental purposes, without the payment to us of any royalty thereon.

This invention relates to a method of packaging and treating articles. More particularly, the invention relates to a method of packaging and irradiating articles to effect sterilization or other treatments.

In recent years the development of atomic energy and its accompanying radioactive by-products have encouraged greater interest in the irradiation treatment of various articles. Irradiation treatments have been employed to initiate certain chemical reactions, such as the polymerization of monomers and the cross-linking of polymers. It has also been discovered that irradiation treatments are effective in the sterilization of foods, drugs and clothing.

In the packaging and preserving of articles, many new techniques have been developed to reduce losses due to the deterioration of articles kept in long-term storage. New packaging materials and more effective sterilization methods have been helpful. Nevertheless, it has remained difficult to insure adequate sterilization for long periods of storage in a variety of climates. In the past the armed forces have experienced extensive losses of packaged items of clothing, shoes, and other articles, stored in tropical or near tropical climates, due to fungus or mold rot.

An object of this invention is to provide a new and improved method of packaging and treating articles.

Another object of the invention is to provide a new and improved method of packaging articles for irradiation treatments.

A further object of the invention is to provide a new and improved method of packaging, sterilizing and preserving articles.

Still another object of the invention is to provide new and improved containers for the irradiation treatment and subsequent storage of articles.

During the process of irradiation to effect sterilization or other types of treatments, the articles or substances being irradiated usually have been held in suitable temporary containers for the duration of the irradiation treatment. Such containers must themselves be substantially unaffected by the irradiation. Many substances break down or degrade under the influence of irradiation, resulting in the formation of undesirable by-products. In the irradiation of food products such by-products may create off-flavors, obnoxious odors or spoilage of the food products. Other irradiated products may exhibit deterioration in appearance or physical properties caused by such by-products. Hence, it is important to utilize containers which are highly resistant to the effects of irradiation. Furthermore, the containers must be chemically inert with respect to the article or substance being irradiated.

Another important attribute of containers for utilization in irradiation treatments, is the ability to transmit the irradiation without losses of energy due to adsorption or reflection by the containers. Hence, it is desirable to employ a relatively thin-walled container through which substantially all of the irradiation passes with only negligible losses in energy.

In accordance with the present invention, irradiation treatments are performed on articles or substances packaged by enclosing and sealing them in containers formed from thin, strong films of a highly irradiation transmissive, chemically inert, moisture impervious, polymeric plastic. Much preferred for this purpose are the polymeric ethylene terephthalates, but polyethylene is also suitable, as is polyvinylidene chloride, etc.

The terephthalate polymers contemplated are film-forming, linear, polyester condensation products of terephthalic acid and a glycol of the series $HO(CH_2)_nOH$, where "$n$" is an integer greater than 1 but not exceeding 10. The preferred member of this series is ethylene glycol. In the production of the polyester product, an ester interchange may be carried out between ethylene glycol and dimethyl terephthalate to form bis-2-hydroxy-ethyl terephthalate monomer, which is subsequently polymerized under reduced pressure and at elevated temperatures to produce polymeric ethylene terephthalate. Products of this type are disclosed in greater detail in U.S. Patent 2,465,319.

Films composed of polymeric ethylene terephthalates are manufactured and sold under the trademark "Mylar" by the E. I. du Pont de Nemours and Company of Wilmington, Delaware. These films and a process of producing them are disclosed in detail in U.S. Patent 2,497,376. The films possess outstanding strength and toughness, being the strongest of all known plastic films. Due to their great strength, the films can be used in thicknesses as low as .00025 inch. In thicknesses up to about .01 inch the films are transparent and show high clarity. Other important characteristics of these films are low water absorbability, high electrical resistivity, and high resistance to abrasion and weathering. Most acids and acid fumes, as well as many common organic liquids, have scarcely any effect on the films. Thus, they are unaffected by gasoline, carbon tetrachloride or naphtha. Hence, the polymeric ethylene terephthalate films are particularly suitable as wrapping materials to form durable, moistureproof packages.

In the wrapping of articles, the films of polymeric ethylene terephthalate offer important advantages. The films are readily sealable to themselves by heating, and this may be accomplished efficiently by high frequency electrical heating. After wrapping a length of the film around an article, the overlapping opposite edges of the film can be readily fused together by means of heat, thereby forming a closed package completely enveloping the article and sealing it from the outside atmosphere. Additional heat may be applied to shrink this package into close engagement with the wrapped article. The resultant package affords maximum protection for the article, and the transparency of the package allows visual inspection of the condition of the article.

It has been discovered that films of polymeric ethylene terephthalate are highly irradiation transmissive and unusually resistant to the effects of irradiation, and these are their most significant characteristics for the purposes of the present invention. When subjected to controlled irradiation at the dosage levels required for the irradiation treatments contemplated for the use of this invention, the films remain virtually unaffected by the irradiation. Of course, it is possible to cause deterioration of the films by means of more highly intense irradiation at higher dosage levels, but this danger can be avoided without difficulty by exercising proper control over the irradiation.

The high intensity ionizing irradiation obtainable from beams of high energy electrons produced by high voltage electron accelerators is readily controllable. There are several well known types of electron accelerators available for this purpose. For example, the Van de Graaff electrostatic accelerator, resonant transformers, transformer-rectifiers, impulse or Marx generators or capacitrons, microwave waveguide linear accelerators, betratrons and synchrotrons. The Van de Graaff type generator, and the transformer-rectifiers produce electron beams in continuous streams, while the other generators mentioned produce the beams in pulses. The electrons in the beams produced by any of these generators ordinarily possess energy exceeding 100,000 electron volts.

The dosage of the irradiation is measured in terms of the quantity of energy absorbed by the material irradiated. The unit of dosage is termed a rep (roentgen equivalent physical). In radiation dosimetry a megarep (or one million roentgen equivalent physical units) is defined as a dose of irradiation producing an energy absorption of 83 million ergs per gram of absorbent material irradiated. In order to effect sterilization by irradiation, a dosage level within the range of about 0.5 megarep to about 3.0 megareps has been found to be satisfactory. The particular dosage level required in each case is dependent upon the thickness and the density of the material being irradiated. Articles packaged in containers formed from films of polymeric ethylene terephthalate have been subjected to irradiation treatments at dosage levels as high as 100 megareps, without causing any appreciable deterioration of the film in terms of container serviceability.

In practicing the invention, various articles to be preserved are packaged by enclosing and sealing them in the specified film-formed containers, and then irradiating them to effect sterilization. The invention is particularly useful in the preservation of fabric material, such as items of clothing, and leather articles, such as gloves and shoes. Such articles may be treated with a fungus inhibitor prior to the packaging operation. At the time the treated articles are packaged it is preferred to replace the atmospheric air surrounding the articles in the containers with an inert atmosphere, such as argon gas, which gas is sufficiently heavy to minimize the rate of gas diffusion through the walls of the film-formed containers. The packaging operation is completed by heat-sealing the edges of the plastic film to seal them together, thereby forming a closed container completely enclosing the article and excluding the outside atmosphere. Heat for the sealing operation may be obtained from any convenient source. High frequency electrical heating is satisfactory, or in some cases a flame may be employed. Alternatively, sealing may be accomplished by means of a suitable cement, and benzyl alcohol may be used as a solvent to assist the sealing action. The resultant fungus-proofed, packaged and irradiated articles are adequately preserved against adverse climatic conditions and microbiological attack.

An important feature of the invention is the fact that the irradiated articles or substances may be retained in long-term storage under various climatic conditions in the same film-formed containers in which they are subjected to irradiation. Hence, it is unnecessary to employ two different types of containers for irradiation and subsequent storage. The transparency of the packaging material allows visual examination of the condition of the articles throughout their storage period. Furthermore, the irradiation transmissive characteristics of the specified film-formed containers permits utilization of nearly 100% of the radiant energy employed, that is, transmission of at least 95% or more of the irradiation dose is attained. Inasmuch as there are no undesirable by-products resulting from the irradiation of the packaging material at the dosage levels required for sterilization, the storage life of the irradiated articles is greatly increased.

The preferred packaging material for practicing the invention is polymeric ethylene terephthalate film, as has been previously stated. This material gives superior results during prolonged periods of storage under adverse conditions. For shorter storage periods under less adverse conditions, polyethylene film is satisfactory.

In a test of the effectiveness of the invention, fungus-inoculated leather gloves and shoes were packaged in polyethylene bags, sterilized by irradiation at dosage levels of about 0.5 to 1.0 megareps on each side, and then placed in storage. These dosage levels were sufficient to effect sterilization without damaging the leather articles or the polyethylene bags. At the end of 18 months, no mold growth was observed on the gloves and shoes packaged and treated in accordance with the invention. However, untreated gloves and shoes stored under the same conditions to serve as controls, had developed a pronounced growth of mold after only thirty days.

Suitable fungus-proofing agents are e.g., copper-8-quinolinolate for fabrics, and paranitrophenol for leather; however, many other fungus-proofing agents well known to the trade may be substituted. The fungus-proofing agents may be applied to the leather or fabric before the leather or fabric is sealed in the film. Additionally or alternately, they may also be applied to the film itself in order to protect the film from attack by fungi during subsequent storage.

The invention is not limited to the sterilization and preservation of articles. Various chemicals, gasoline, polymerized plastics, or polymerizable monomers may be packaged in the film-formed bags and subjected to high intensity ionizing irradiation. In the case of the monomers, it has been found that irradiation at a suitable dosage level can be utilized to initiate polymerization without the assistance of any chemical catalyst or promoter. In this manner, polymerization can be achieved at low temperatures where adverse thermal effects can be avoided, and the resultant polymer is essentially pure. Due to the transparency of the films, it is possible to observe the progress of the treatment as well as its results.

The invention may be practiced successfully by utilizing any of several different types of high intensity ionizing radiation. Among the types contemplated are beta rays, gamma rays, and beams of high energy electrons produced by any of the high voltage electron accelerators previously mentioned. Beta irradiation may be advantageously produced by the Van de Graaff electrostatic accelerator, because in this type of irradiation the desired dosage is speedily attained and readily controlled. When gamma rays are employed as the source of irradiation, radio-active isotopes in the form of gross or separate fission products, spent atomic fuel elements, or gaseous products from atomic reactors may be employed.

When polymeric terephthalate films are used for the container, care should be taken to avoid overheating of the film inasmuch as excessive heat results in a loss of a considerable amount of its strength and chemical resistance.

In the foregoing description of the invention, numerous important advantages have been mentioned and several different purposes for the invention have been suggested. Other uses and purposes for the invention may be readily devised by persons skilled in the art, and minor changes and modifications may be effected without departing from the spirit and the scope of the invention. Consequently, the invention defined by the subjoined claims should be given the broadest possible interpretation.

We claim:

1. A method of preserving leather material, comprising the steps of treating said material with paranitrophenol as a fungus inhibitor, enclosing the treated material in a closed gas-impervious container formed from a thin transparent film composed of polymeric ethylene terephthalate, and exposing the resultant package to high intensity ionizing irradiation at a dosage level of at least about 0.5 megarep to effect sterilization.

2. A method of preserving leather material comprising the steps of treating said material with paranitrophenol as a fungus inhibitor, wrapping the treated material with a thin transparent film composed of polymeric ethylene terephthalate, sealing the edges of the film together to form a closed gas-impervious container completely enclosing the article and excluding the outside atmosphere, and exposing the resultant package to controlled irradiation by beams of high energy electrons at a dosage level of at least about 0.5 megarep to effect sterilization.

3. The method according to claim 1, wherein the air in said container is replaced by an inert gas prior to closing said container.

References Cited in the file of this patent

UNITED STATES PATENTS

| | | |
|---|---|---|
| 2,160,367 | Marfield | May 30, 1939 |
| 2,387,812 | Sonneborn | Oct. 30, 1945 |
| 2,456,909 | Brasch | Dec. 21, 1948 |
| 2,721,941 | McMaster | Oct. 25, 1955 |

OTHER REFERENCES

Huber: Electronics, March 1948, (7 pp.), reprint.

Summer: Manuf. Chem., vol. 23, No. 11, November 1952, pp. 451–455.

Trump: Cathode Press, Winter 1950–51, pp. 10–13 and 25.